Dec. 10, 1957  C. H. STEVENSON III  2,815,846
FEEDING AND ORIENTING DEVICE
Original Filed June 9, 1948  4 Sheets-Sheet 3

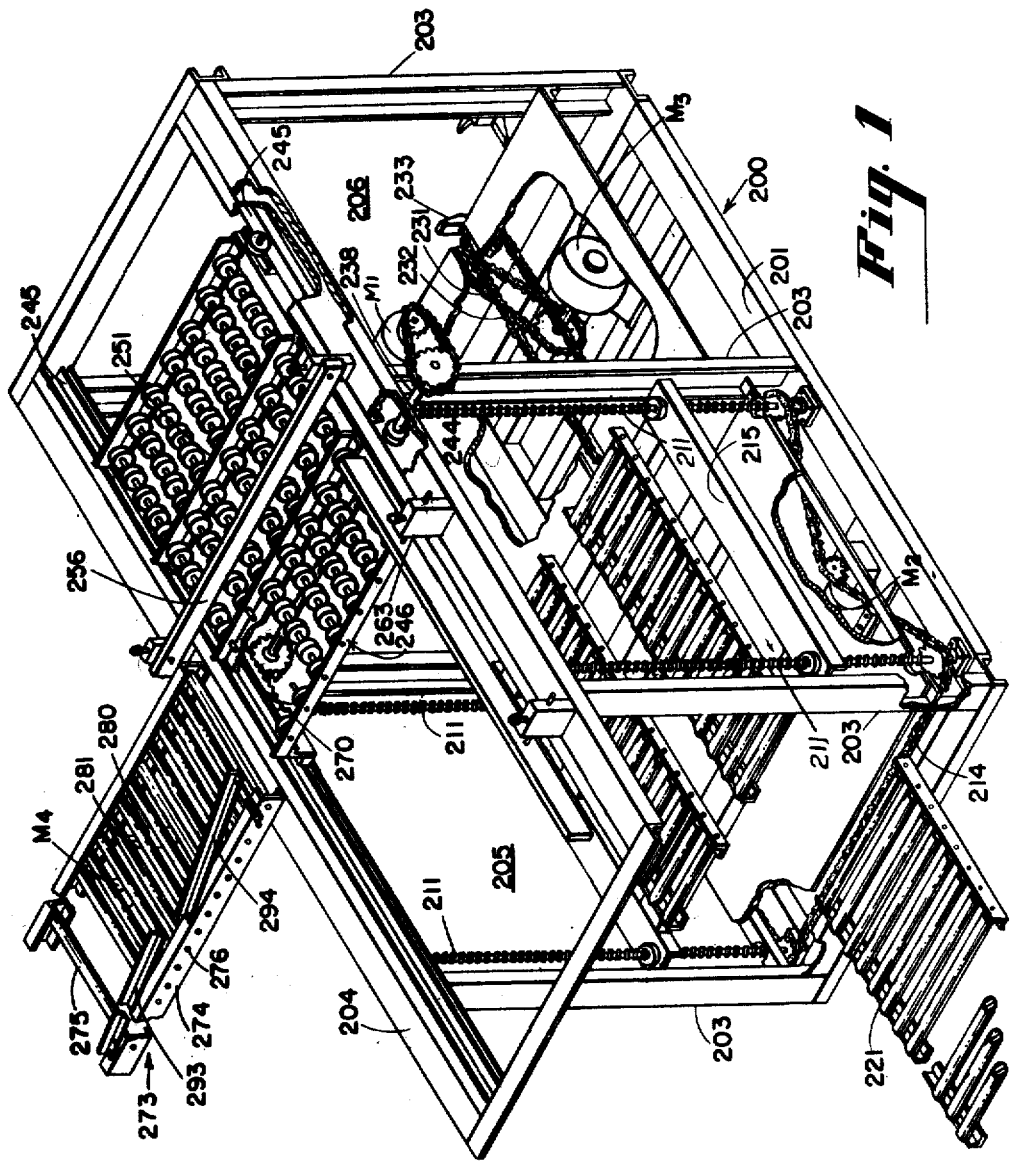

INVENTOR.
CLARENCE H. STEVENSON III
BY
Hans G. Hoffmeister
ATTORNEY

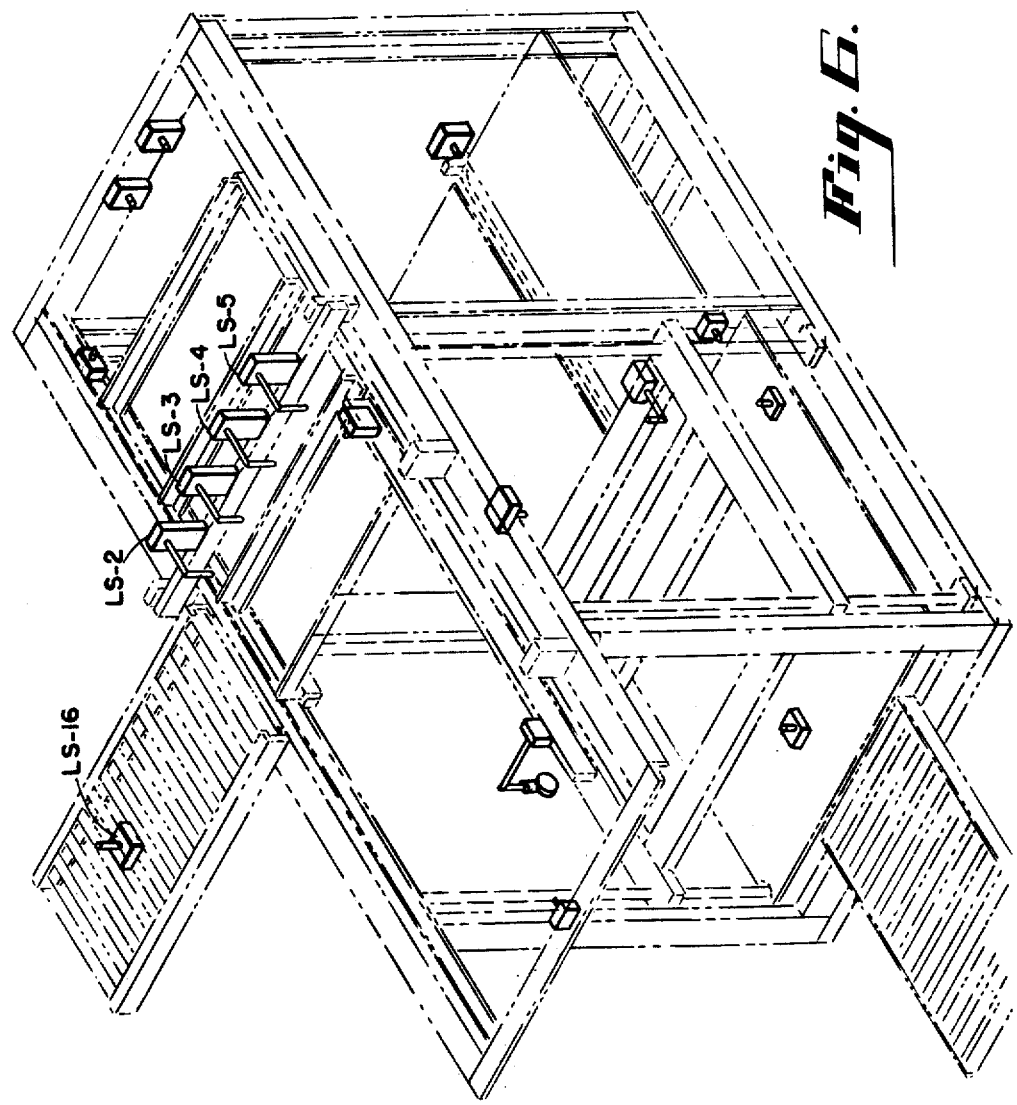

United States Patent Office 2,815,846
Patented Dec. 10, 1957

2,815,846
FEEDING AND ORIENTING DEVICE

Clarence H. Stevenson III, Los Angeles, Calif.

Original application June 9, 1948, Serial No. 31,961, now Patent No. 2,701,650, dated February 8, 1955. Divided and this application April 27, 1953, Serial No. 351,179

24 Claims. (Cl. 198—33)

My invention relates to feeding and orienting devices and more particularly to feeding and orienting devices for automatic pallet loading machines.

This application is a division of my copending application Serial No. 31,961, filed June 9, 1948 for Pallet Loading Device, now Patent 2,701,650.

The general object of this invention is to provide a feeding and orienting device that is capable of conveying articles to be loaded from the end of an assembly line onto a pallet of a pallet loading machine in the desired manner.

Another object is to provide a feeding and orienting device that will load cartons or other objects in any predetermined interlocked pattern onto a pallet regardless of the height or shape of the articles, thereby insuring maximum stability of a load.

It is also another object to provide a feeding and orienting device that is capable of loading on a pallet rectangular articles having one side longer than the other in such a manner that the long side of an article or carton will face one way in one layer and the next layer will be deposited with the long side of the carton turned up to 90° with respect to the corresponding side of the article below it in the previous layer. This has the effect of locking the end of the cartons or articles to each other as they are stacked.

A particular feature of my invention is the provision of a device that automatically orients the articles, particularly rectangular objects as they travel to the collector plate on the conveyor that transfers the articles from the assembly line to the collector plate. The device is designed to automatically vary the orientation of the articles of each respective layer as desired. For example, the long side of the carton or case may face one way in the first layer while in the second layer the long side of the cartons can be oriented up to 90° with respect to the long side of cartons of the first layer and the articles in the succeeding layers alternating in position in the same manner as those in the first and second layers.

Another feature of my device is that it is capable of handling any size box, carton or other container, as long as it does not exceed the capacity of the pallet loading machine with which it is associated, and accomplishes such handling with the same ease regardless of whether the cartons are large or small, heavy or light.

A further object is to provide a feeding and orienting device having a feed conveyor that takes fully loaded articles from the conveyor belt of an assembly line and conducts them onto the collector plate of a pallet loading machine arranging the articles on the collector plate in any desired pattern.

A particular advantage of the present device is that it is capable of operating entirely without supervision, it only being necessary that fully loaded cartons, cases or the like are supplied to the conveyor belt thereof.

Another advantage of the device is the fact that it is capable of feeding and stacking articles on pallets more stably since each article is deposited in the best position to impart maximum stability to the load.

A further advantage is that the feeding and orienting device, according to my invention, is capable of varying the orientation of the articles of each layer of articles thereby locking the ends of the articles and imparting maximum stability to the load.

The foregoing and other objects of my invention will be better understood with reference to the following drawings in which:

Fig. 1 is a perspective view of a machine incorporating the feeding and orienting device of the present invention.

Fig. 6 is a phantom drawing of the device showing the location of the switches according to one embodiment of the invention.

Figure 3:
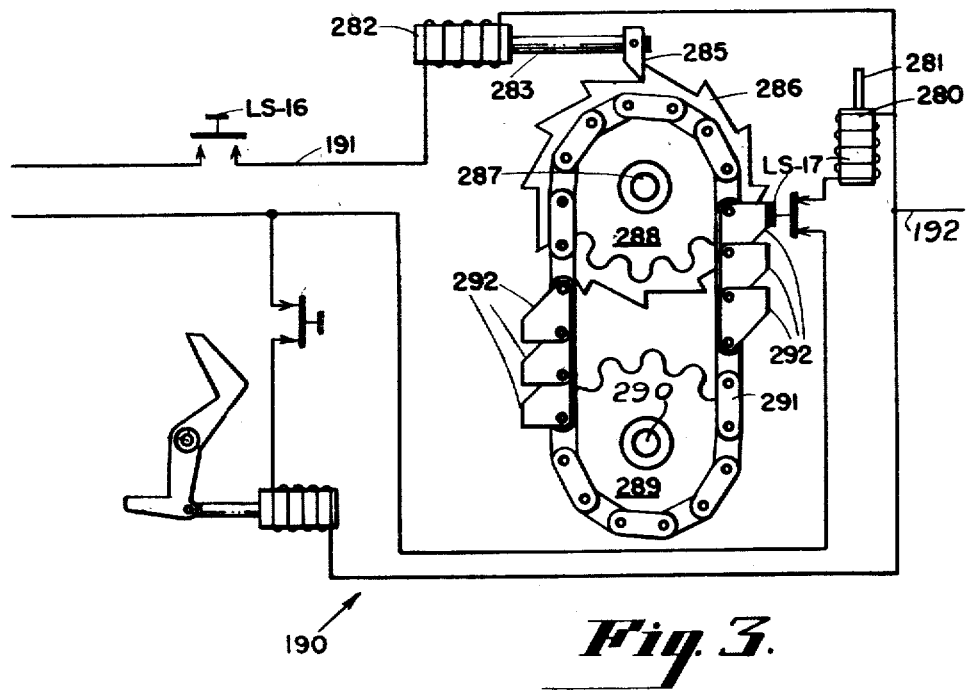
Fig. 3 is a partly schematic view of the mechanism and wiring which operates the pallet supports and locking device in the rear compartment, said view also including the mechanism for operating an article orienting solenoid on the feed conveyor.
Figure 2:
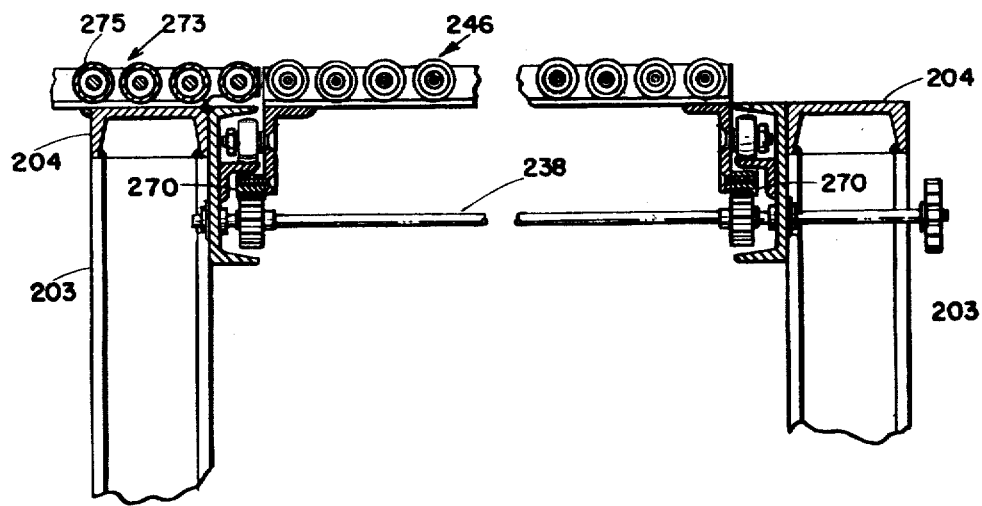
Fig. 2 is a view, partly in cross section, showing the manner in which a collector plate is made reciprocable on the supporting frame of machine of Fig. 1.

The mechanical portion of the device comprises essentially a framework 200 (Fig. 1), an elevator or lift platform 215, a reciprocating collector plate assembly 246, and a feed conveyor assembly 273 that transfers articles from the end of an assembly line to the collector plate.

The framework 200 is preferably constructed of suitable structural members such as bars, I beams, angles, channels, and similar members. The bottom and top frame members 201 and 204 respectively are preferably rectangular. The upright members 203 and the rectangular bottom member 201 and top member 204 are secured together by any suitable means such as welding, bolting, or the like. The central upright members 203 divide the box-like structure into a forward compartment 205 and a rearward compartment 206. These compartments are preferably proportioned to be of approximately the same size.

A stack of pallets (not shown) is stored in the rearward compartment 206. These pallets are arranged to be moved forwardly, one by one, into compartment 205 by lugs 233 which are carried on an endless chain 232. A motor M3 is connected in driving relation with the chain 232 through a second chain 231. When a pallet is moved into forward compartment 205, it is positioned on the lift platform 215 that is arranged to be raised and lowered in the compartment 205 by means of a motor M2 acting through an endless chain 214 and lead screws 211. A collector plate assembly 246, which is divided into zones by cross members 251, is mounted for reciprocating movement longitudinally of the frame 200 in tracks 245 in the upper portion of the frame. A plurality of normally open switches (Fig. 6), four by way of example, numbered LS-2, LS-3, LS-4, LS-5, are secured above the collector plate 246 and are positioned immediately in front of a rigid stationary wiper bar 256 (Fig. 1). These switches are closed by articles being moved onto the collector plate to form a row of articles thereon. A reversible motor M1 is operatively connected to the collector plate assembly 246 through a drive chain 244, a shaft 238, and a rack 270 that is secured to the frame of the collector plate. When a row of articles is assembled in the first zone of the collector plate, the plate is moved forward to bring the next zone to article-receiving position. When a complete layer is formed on the plate, the wiper bar 256, which is mounted across the upper end of the frame 200 just above the collector plate, is effective to strip the layer of articles from the collector plate and move the layer onto a pallet therebelow, as the collector plate moves rearwardly. When a pallet is loaded with the desired number of layers of articles, it is carried out of the machine by a conveyor 221.

The details of construction of the various components of the machine, and the details of the electrical circuit which controls the operating sequence of the components, including switches LS-2, LS-3, LS-4 and LS-5, are completely disclosed in the previously mentioned Patent 2,701,650.

Figure 4:
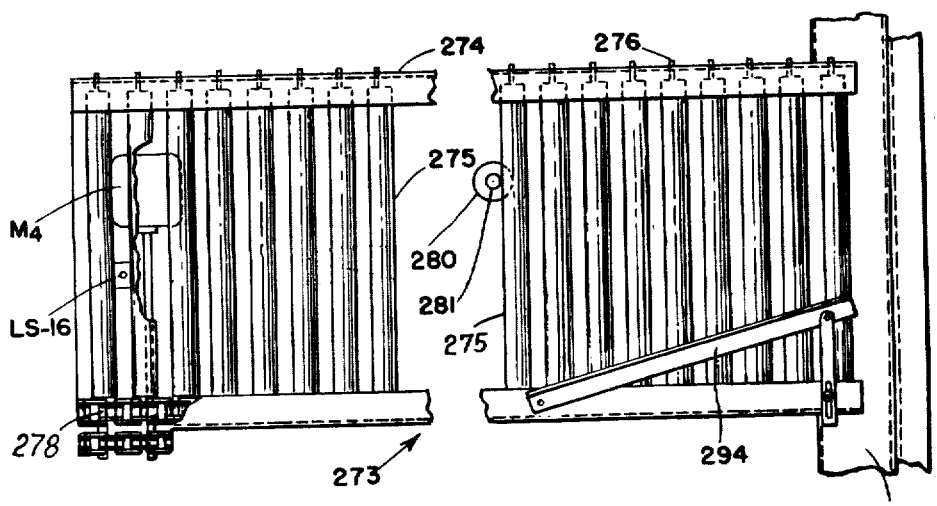
Fig. 4 is a top plan view partly cut away of the feed conveyor.
Figure 5:
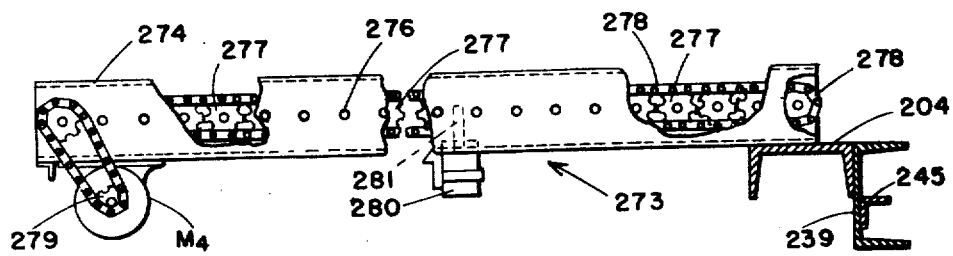
Fig. 5 is a side elevational view partly cut away of the feed conveyor.

The present invention is particularly concerned with the feeding and orienting of articles on the feed conveyor 273, which transports the articles such as cartons or other rectangular objects from the end of the assembly line (not shown) to the collector plate assembly 246. This feed conveyor (Figs. 1, 4 and 5) comprises a rectangular framework 274 which supports a plurality of cylindrical rollers 275 mounted on shafts 276. The shafts 276 are placed perpendicular to the long side of the framework 274 and parallel to each other. Bearings may be used on each end of shafts 276, if desired, and secured to the framework 274 at uniform intervals. A corresponding number of sprockets 277 are secured to one end of each shaft and are linked together by an endless chain 278 such as shown in Figs. 4 and 5. A motor $M_4$ is secured to the lower side of rectangular framework 274 and is provided with a sprocket 279. The chain 278 is driven by the sprocket 279.

A pair of adjustable guides 293 and 294 Fig. 1 are attached to the upper edge of framework 274 and serve to guide the articles traveling down the conveyor so that they will be discharged onto the collector plate 246 at the proper zone.

A solenoid 280 having a plunger 281 is secured to the lower side of framework 274 below rollers 275. The top of the plunger 281 is normally below the tops of these rollers 275 and extends above the tops of the rollers only when the solenoid 280 is energized. Figs. 1 and 4 show the solenoid 280 and its plunger 281 in their preferred location.

A normally open switch LS-16 (Figs. 3 and 6) is positioned near the entrance end of the feed conveyor 273 between a pair of the aforesaid rollers 275 said switch having the article contacting member thereof extending slightly above the top of the rollers. Each article coming onto the conveyor passes over said article contacting member and closes the switch while in contact with it. A second solenoid 282 (Fig. 3) is connected in series with switch LS-16 by wires 191 and 192. The solenoid 282 is energized each time switch LS-16 is closed, and a plunger 283 of the solenoid 282 is extended outwardly each time the circuit is closed. Plunger 283 retracts every time solenoid 282 is de-energized. The end of plunger 283 is provided with a pawl 285 which acts against a ratchet wheel 286 mounted on a shaft 287. This assembly or counter device may be located at any convenient position and need not be on the main device. As shown in the drawings it is connected to the electrical system and is numbered 190.

A sprocket 288 of the counter device 190 is mounted and integrally secured to the ratchet wheel 286 either by riveting, bolting, welding, or the like or it may be mounted on the end of shaft 287 in which case both sprocket 288 and ratchet wheel 286 are keyed, splined, or otherwise attached to shaft 287 to maintain them in fixed relationship. A second sprocket 289 of the counter device is mounted on a second shaft 290 which is supported in any desired manner. Sprocket 289 is positioned to correspond to sprocket 288. An endless chain 291 passes over sprockets 288 and 289. The preferred arrangement is such that the teeth of ratchet wheel 286 and the links of chain 291 are mathematically integrated so that one tooth turn of ratchet wheel 286 will move one link of the chain past any given point.

Chain 291 is provided with a plurality of lugs 292 which may be distributed on the chain in any predetermined arrangement. A normally open switch LS-17 is positioned so that the lugs 292 will strike against it when they come into position causing it to close. When this occurs solenoid 280, located on the feed conveyor 273, becomes energized causing plunger 281 to extend above the top of the rollers 275.

In the operation of the machine, articles such as rectangular cartons are advanced along the feed conveyor 273 and are discharged onto the collector plate 246. When a row consisting of a desired number of articles has been formed on the collector plate 246, the feed conveyor rollers 275 are stopped and the collector plate is moved forward, advancing the first row of articles in the direction of the arrow in Fig. 1, and bringing another zone of the collector plate into alignment with the feed conveyor. A second and third row of articles are deposited in succession on the collector plate to form a layer which is subsequently stripped off the plate onto a pallet as the plate is moved rearwardly under the bar 256.

The arrangement of the articles on the pallet in a predetermined pattern is under the control of the counter 190 which governs the energization and deenergization of the solenoid 280. When the solenoid 280 is energized the plunger 281 is projected above the rollers 275 into the path of the oncoming articles on the conveyor 273 and when the solenoid 280 is deenergized the plunger 281 returns to its normally retracted position below the tops of the rollers 275. The energization of the solenoid 280 and the resultant projection of the plunger 281 into the path of the oncoming articles is obtained in the following manner: The lever of the normally open switch LS-16 located on conveyor 273, projecting slightly above rollers 275, closes the circuit of solenoid 282 each time an article passes over it. When this occurs, the solenoid 282 is energized causing its plunger 283 and its pawl 285 to advance ratchet wheel 286 of counter device 190 one tooth. Concurrently therewith, the sprocket wheels 288 and 289 having the sprocket chain 291 trained therearound together with the lugs 292 thereof are all similarly advanced. The instant that the article moves off the switch LS-16 the switch opens, de-energizes solenoid 282 and causes its plunger 283 to retract. This occurs every time an article traveling down the feed conveyor 273 passes over switch LS-16. When sufficient articles or cartons have passed over the switch LS-16 to advance one of the lugs 292 so that it makes contact with the lever of the normally open switch LS-17, the circuit through the solenoid 280 on conveyor 273 is completed, energizing the solenoid and causing its plunger 281 located between a pair of rollers 275 on the feed conveyor 273, to project above the tops of the rollers. When the plunger projects above the rollers 275 of the feed conveyor 273 it is disposed in the path of the articles traveling down the conveyor 273 from the assembly line. Since the articles are being propelled by the rollers 275 they will come in contact with the obstruction provided by the solenoid plunger 281. If this obstruction strikes an article on one side correctly it will cause the article to be automatically pivoted before it can clear the obstruction offered by the plunger 281 and proceed down the feed conveyor 273. By properly positioning the plunger 281 the article can be made to turn at any angle up to 90°. The article, such as a rectangular carton, is then discharged onto the collector plate 246 with its longitudinal axis revolved a predetermined angle from that of the longitudinal axis of the previous article, which passed over the feed conveyor 273 when the plunger 281 was not projected above the top of the rollers 275. By properly positioning the lugs 292 on the chain 291 and correctly locating plunger 281 any desired or predetermined loading pattern can be automatically obtained.

The orienting device according to my invention is particularly valuable in cases where pallets are to be loaded at great heights and the load may be subjected to rough handling. The orienting device arranges the articles in one layer in interlocking relation to those in the adjacent layer thereby insuring a load possessing maximum stability.

The machine is entirely automatic and therefore requires little or no supervision, other than making the necessary adjustments to produce the desired effects and supplying empty pallets to the empty pallet compartment.

Having thus described the present invention, what I claim as new and desire to protect by Letters Patent is:

1. A conveyor device for conducting articles comprising a supporting means, roller means on which said articles travel mounted on said supporting means, first switch means engageable by said articles traveling over said roller means, counter means actuated by the closing of said switch means, a second switch means operable by said counter means, and orienting means operable by said second switch means for projecting an obstruction into a predetermined position in which said obstruction is arranged to obstruct the passage of an article passing over said roller means and to effect turning of the article upon abutment of the article with said obstruction.

2. A conveyor device for conducting articles according to claim 1 in which driven roller means are provided in said conveyor, and motor means for driving said roller means.

3. A conveyor device for conducting articles comprising a supporting means, roller means on which said articles are progressively advanced in said supporting means, switch means engageable by said articles traveling on said roller means, a solenoid having a plunger connected to said switch means, a ratchet against which said plunger acts, a sprocket connected to said ratchet, a chain provided with a plurality of lugs driven by said sprocket, a second solenoid provided with a plunger positioned between said rollers, and a second switch means engageable by said lugs to actuate said second solenoid causing the plunger of said second solenoid to project in the path of said articles.

4. A device for conducting articles comprising article conveyor means, a first switch means actuated by the articles carried by said conveyor means, counter means actuated by the closing of said first switch means, a second switch means actuated by said counter means, and an orienting means in juxtaposition with said conveyor means, said orienting means including an obstruction projected to one side of the center of and in the path of oncoming articles carried by said conveyor means upon actuation of said orienting means by the closing of said second switch means.

5. A conveyor device for conducting articles according to claim 4 in which the article conveyor means is provided with guide means for establishing the position from which articles are discharged from said conveyor means.

6. A conveyor device for conducting articles according to claim 4 in which the article conveyor means includes driven roller means.

7. A conveyor device for conducting articles according to claim 4 in which the position of the article orienting obstruction is adjustable and said obstruction includes a solenoid actuated plunger activated by the closing of said second switch means.

8. A device for conducting articles to be stacked comprising power driven article conveyor means, a first switch actuated by the articles carried by said conveyor means, counter means actuated by the closing of said first switch means, a second switch means actuated by said counter means, an orienting means in juxtaposition with said conveyor means, said orienting means including an obstruction projected to one side of the center of and in the path of oncoming articles carried by said conveyor means upon actuation of said orienting means by the closing of said second switch means, and means including a plurality of switches positioned to be successively actuated by the articles discharged from said conveyor means and adapted upon discharge of a predetermined number of such articles to deactivate said power driven conveyor means.

9. A device for orienting articles comprising a conveyor for advancing the articles along a predetermined path, article obstructing means located at one side of said conveyor and movable into and out of a position at one side of the center of and in the path of the articles advancing on said conveyor, and means for selectively actuating said obstructing means so as to obstruct the travel of certain of the advancing articles to effect turning thereof on said conveyor around said obstructing means and about an axis in and perpendicular to said path into a different position for further advancement along said path.

10. A device for orienting articles comprising a conveyor for advancing the articles along a predetermined path, article obstructing means movable into and out of a position in front of articles advancing on said conveyor, means for operating said obstructing means so as to obstruct the travel of certain of the articles to effect turning thereof on said conveyor about a vertical axis when the leading edge of the article contacts said obstructing means for further advancement of the articles thereon in a different position, and means actuated by the advancing articles for controlling the performance of said operating means.

11. A control for a palletizer of the type employing an article feed conveyor, said control comprising counter means responsive to the articles advancing along said feed conveyor, and article obstructing means movable into and out of an article intercepting position at one side of the center of and in the path of the articles on said feed conveyor and means activated by said counter means to move said article obstructing means periodically into said intercepting position in the path of the articles on the feed conveyor to effect turning of certain of said articles on said feed conveyor into a different position for further advancement thereof on said same feed conveyor.

12. A control for a palletizer of the type employing an article feed conveyor, said control comprising an electric counter responsive to each article advancing along said feed conveyor and article obstructing means associated with said feed conveyor and selectively moved by said electric counter to a position in front of articles advancing on said feed conveyor, said counter being arranged upon being actuated by a particular article to move said obstructing means into article intercepting position before said particular article reaches the obstructing means whereby said particular article will contact said obstructing means and be turned into a different position.

13. A control for a palletizer of the type employing an article feed conveyor, said control comprising a counter responsive to the passage of articles on said feed conveyor, article obstructing means associated with said feed conveyor and movable into and out of the path of the articles advancing therealong, and means activated by said counter for moving said obstructing means into and causing same to remain in the path of a pre-selected number of articles traveling along said feed conveyor to thereby effect turning of each of said pre-selected articles successively on said feed conveyor into a predetermined angular position.

14. A control for a palletizer of the type wherein articles are fed by a conveyor to article orienting means and thereafter to a loading platform whereon they are formed in a layer of a predetermined geometric pattern, said control comprising a counter responsive to the passage of articles on said conveyor, article obstructing means associated with said conveyor and movable into and out of a position at one side of the center of and in the path of the articles advancing therealong, and means activated by said counter for operating said obstructing means to cause same to move in predetermined timed sequence into and out of the path of articles traveling along said conveyor to effect turning of certain of said articles on said conveyor into a different position during a layer forming cycle of said palletizer.

15. A device for conducting articles from a production line to a collector station, said device comprising article conducting means, timing means responsive to articles moving along said conducting means, and article orienting means operable by said timing means to project an obstruction to one side of the center of and in the path of selected articles advancing on said conducting means to obstruct the travel of and effect turning of selected articles during their passage along said conducting means.

16. A device for conducting articles from a production line to a collector station, said device comprising article conveyor means, article counter means responsive to articles moving along said conveyor means, and article orienting means operable by said counter means to project an obstruction to one side of the center of and into the path of selected articles passing along said conveyor means to thus intercept said articles and impart a predetermined amount of rotation to such articles upon contact therewith.

17. A device for conducting articles from a production line to a collector station, said device comprising a conveyor, a feeler switch mounted to lie in the path of and to be actuated by each article traveling along said conveyor, counting means including a solenoid, a circuit leading from said feeler switch to said solenoid whereby contact by an article with said feeler switch will step off said counting means, and article orienting means operable by said counting means to project an obstruction to one side of the center of and into the path of selected articles passing along said conveyor to thus intercept the articles and impart a predetermined amount of rotation to such articles upon contact therewith so that upon discharge of the articles from said conveyor they will interfit in interlocking and overlapping relationship with the non-rotated articles discharged from said conveyor means at said collector station.

18. An article feeding device comprising conveying means for conducting the articles along a predetermined path, a normally ineffective article obstructing element located at one side of said conveying means and arranged to be projected into the path of oncoming articles on said conveying means at one side only of the center of the path to effect turning of the articles about an axis perpendicular to said conveying means into a different position for further advancement thereof, and means operable to effect projection of said article obstructing means into the path of selected articles on said conveying means.

19. An article feeding device for a palletizer comprising conveying means adapted to conduct the articles to the palletizer, a normally ineffective article obstructing element located at one side of said conveying means and operable to project into the path of the articles at a fixed point along said conveying means and in a direction perpendicular to the direction of advance of the articles on said conveying means to intercept the articles and effect turning of the articles about an axis perpendicular to the direction of advance of the articles into a different position for further advancement of the articles on said same conveying means, and means operable to effect projection of said article obstructing means into the path of selected articles on said conveying means before the articles reach said fixed point.

20. An article feeding device for a palletizer comprising conveying means adapted to conduct the articles to the palletizer, a normally ineffective article obstructing element operable to project to one side of the center of and into the path of oncoming articles in a direction perpendicular to the direction of advance of the articles on said conveying means to effect turning of the articles into a different position for further advancement thereof on said same conveying means, and counter means responsive to the articles advancing on said conveying means and operative upon passage of a predetermined number of articles on said conveying means to cause projection of said article obstructing means into article intercepting position in front of the articles advancing on said conveying means.

21. A conveyor device for conducting articles comprising a supporting means, roller means on which said articles travel mounted on said supporting means, first switch means engageable by said articles traveling over said roller means, counter means actuated by the closing of said switch means, a second switch means operable by said counter means, and orienting means including a solenoid actuated by said second switch means for projecting the plunger of said solenoid into the path of said articles passing over said roller means.

22. A device for orienting articles comprising a conveyor having an article conveying surface for advancing the articles along a predetermined path, article obstructing means disposed at one side only of the center of and in the path of the articles advancing on said surface, said obstructing means being arranged to turn the articles about an axis perpendicular to said surface into a different position thereon upon contact of the articles with said obstructing means, and means for rendering said obstructing means inoperative to prevent interception and turning of the articles thereby.

23. A device for orienting articles comprising a conveyor for advancing articles along a predetermined path, first switch means responsive to the passage of articles advancing on said conveyor, counter means responsive to the actuation of said switch means, a second switch means operable by said counter means, orienting means disposed at one side of the center of and in the path of articles advancing on said conveyor and arranged to turn the articles into a different position on the conveyor upon the articles being moved into contact with said orienting means, and means responsive to actuation of said second switch means for rendering said orienting means inoperative to prevent the interception and turning of the articles by said orienting means.

24. A control for a palletizer of the type employing an article feed conveyor, said control comprising a counter responsive to the passage of articles on said feed conveyor, article obstructing means disposed at one side of the center of the path of movement of the articles advancing on said conveyor, said obstructing means being arranged to obstruct the passage of articles on said conveyor and to effect turning of the articles upon abutment of the articles therewith, and means under the control of said counter for rendering said obstruction means inoperative for a preselected number of articles advancing along said conveyor.

References Cited in the file of this patent

UNITED STATES PATENTS

| 864,493 | Swift | Aug. 27, 1907 |
| 1,787,901 | Sottschalk | Jan. 6, 1931 |
| 1,789,253 | Parker | Jan. 13, 1931 |
| 2,063,230 | Crady | Dec. 8, 1936 |
| 2,346,285 | Beaulieu | Apr. 11, 1944 |
| 2,633,251 | Bruce | Mar. 31, 1953 |

FOREIGN PATENTS

| 479,675 | Germany | July 20, 1929 |

U. S. DEPARTMENT OF COMMERCE
PATENT OFFICE

CERTIFICATE OF CORRECTION

Patent No. 2,815,846                          December 10, 1957

Clarence H. Stevenson III

It is hereby certified that error appears in the printed specification of the above numbered patent requiring correction and that the said Letters Patent should read as corrected below.

Column 6, line 13, strike out "a" and insert instead -- article obstructing --.

Signed and sealed this 11th day of March 1958.

(SEAL)
Attest:

KARL H. AXLINE
Attesting Officer

ROBERT C. WATSON
Commissioner of Patents